United States Patent [19]
Iokibe

[11] Patent Number: 5,175,801
[45] Date of Patent: Dec. 29, 1992

[54] METHOD FOR CARRYING OUT FUZZY INFERENCE

[75] Inventor: Tadashi Iokibe, Shizuoka, Japan

[73] Assignee: Kabushiki Kaisha Meidensha, Tokyo, Japan

[21] Appl. No.: 581,770

[22] Filed: Sep. 13, 1990

[30] Foreign Application Priority Data

Sep. 14, 1989 [JP] Japan .................................. 1-239514

[51] Int. Cl.$^5$ ............................................. G05B 13/02
[52] U.S. Cl. ...................................... 395/61; 395/900
[58] Field of Search ................ 364/513, 807; 395/900, 395/3, 61

[56] References Cited

U.S. PATENT DOCUMENTS

5,012,430  4/1991  Sakurai ............................... 364/513

FOREIGN PATENT DOCUMENTS

0375155  6/1990  European Pat. Off. .

OTHER PUBLICATIONS

Scharf et al., "The Application of a Fuzzy Controller to the Control of a Multi-Degree-of-Freedom Robot Arm", Industrial Appl. of Fuzzy Control, 1985, 41–68.
Sugiyama, K., "Rule-Based Self-Organising Controller", Fuzzy Computing, 1988, 341–353.
Waller, L., "Fuzzy Logic Microprocessor Tackles Real-Time Tasks", Electronic Design, Feb. 1989, p. 25.
Watanabe et al., "A VLSI Fuzzy Logic Controller with Reconfigurable, Cascadable Architecture", IEEE Journ. Solid-State Circuits, 25(2), Apr. 1990, pp. 376–382.
Lee, C. C., "Fuzzy Logic in Control Systems: Fuzzy Logic Controller-Part I", IEEE Trans Syst. Man & Cybernetics, 20(2) Apr. 1990, 404–418.

Primary Examiner—Michael R. Fleming
Assistant Examiner—Robert W. Downs
Attorney, Agent, or Firm—Bachman & LaPointe

[57] ABSTRACT

An apparatus for carrying out fuzzy inference and a method therefor are disclosed in which an oblivescence coefficient is introduced and multiplied by a membership function of a conclusion portion in each operating variable linguistic control rule, the oblivescence coefficient being determined through a fuzzy inference according to an oblivescence element corresponding to a difference of times at which the linguistic control rule is established and at which it is used, and/or situations in which the linguistic control rule is established and in which it is used, and the determined oblivescence coefficient is used to vary a weight, or importance, of the linguistic control rule for the operation of the controlled object according thereto so that each linguistic control rule can flexibly be used to execute the fuzzy inference according to its used date, place, and object.

2 Claims, 3 Drawing Sheets

METHOD FOR CARRYING OUT FUZZY INFERENCE

BACKGROUND OF THE INVENTION (1) Field of the Invention

The present invention relates to an apparatus for carrying out fuzzy inference with an oblivescence function and method therefor.

(2) Background Art

The concept of fuzzy logic can be said to be a high level of thinking even though it is indefinite. For example, a machine operator (expert) has plenty of know-how on the machine's method of operation, such know-how consists primarily of quantitative emprical rules. However, to utilize such emprical rules, fuzzy inference has been proposed such that quantitative emprical rules are expressed in fuzzy terms or fuzzy sets as qualitative values using linguistic control rules (LCRs, if—is—, then—is—) and inference is executed on the basis of the linguistic control rules of expression.

A Japanese document named "introduction of fuzzy engineering (Fuzzy Engineering Nyuumon)" published on Jul. 15, 1989 exemplifies a control system using fuzzy inference to the tunnel trenching in a shield construction method.

In such a system utilizing fuzzy inference, it is important to aquire rules (knowledge) and to deal with each rule equally.

On the other hand, a machine operator, or other such skilled person (expert), may change his or her methods depending on date (or time of year), location, and/or situation and makes decisions in conformity to his or her state.

As a basic example, as to enviroment, a water temperature which would be assigned a qualitative value of warm in a cold winter, may be considered cool in a hot summer, or in regard to a state or condition, an object which may be considered light by an energetic person may be heavy to a tired person. These are qualitative operating variables utilized naturally by human beings. This means that some rules (knowledge or qualitive assumptions) may become dim, or disregarded due to oblivescence while some rules are called upon and utilized without oblivescence A system of fuzzy inference utilizing such principles has been proposed to be applied for controlling automatic dredging and/or tunnel trenching apparatus.

However, in previously proposed fuzzy inference systems, such functions as oblivescence or reproduction of knowledge are ignored and thus a serious defect is present for structuring a truly human friendly system (or problem solving supporting system).

SUMMARY OF THE INVENTION

It is an object of the present invention to provide a fuzzy inference apparatus and method for carrying out fuzzy inference in which fuzzy inference is executed using only a base of meaningful knowledge with a function allowing oblivescence of knowledge and reproduction thereof to be taken into account to arrive at an actual solution of problem.

The above-described object can be achieved by providing a system for carrying out fuzzy inference, comprising: a) first means for deriving an oblivescence element for each linguistic fuzzy control rule used to execute the fuzzy inference for at least one operating variable of a controlled object, the oblivescence element being a value corresponding to a difference in time, position, and/or situation between a first information and second information, the first information being information on the time at, the postion in, and/or the situation in, which the controlled object is placed when the corresponding operating variable linguistic control rule is established, and the second information being the information on the same element at present; b) second means for providing an oblivescence linguistic control rule which defines a correlationship of an oblivescence coefficient with an oblivescence element for each operating variable linguistic control rule and for executing fuzzy inference of the oblivescence coefficient for each operating variable linguistic control rule on the basis of the rule and the oblivescence element; and c) third means for providing the operating variable linguistic control rules and for multiplying a membership function value in each concluding portion of each operating variable linguistic control rule by the oblivescence coefficient.

The above-described object can also be achieved by providing a system for controlling a controlled variable of a controlled object using fuzzy inference, comprising: a) first means for monitoring the controlled variable; b) second means for setting a target controlled variable of the controlled object; c) third means for storing membership functions for the controlled variable and setting a target operating variable of the controlled object using fuzzy inference based on the membership functions so that the controlled variable coincides with the target controlled variable; d) fourth means for deriving a weighting coefficient of the membership functions from an oblivescence factor approximating that of a well-skilled, long experienced person operating the controlled variable, the oblivescenece factor being determined according to a time it takes for the controlled object to move toward a destination, position of the controlled object and/or situation in which the controlled object is placed; and e) fifth means for varying the membership functions according to the weighting factor.

The above-described object can also be achieved by providing a method for carrying out fuzzy inference, comprising the steps of: a) deriving an oblivescence element for each linguistic fuzzy control rule used to execute the fuzzy inference for an operating variable of a controlled object, the oblivescence element being a value corresponding to a difference in time, position, and/or situation between a first information and second information, the first information being information on the time at, the postion in, and/or the situation in, which the controlled object is placed when the corresponding operating variable linguistic control rule is established, and the second information being the information on the same element at present; b) providing an oblivescence linguistic control rule which defines a correlationship of an oblivescence coefficient with an oblivescence element for each operating variable linguistic control rule and for executing fuzzy inference of the oblivescence coefficient for each operating variable linguistic control rule on the basis of the rule and the oblivescence element; and c) providing the operating variable linguistic control rules and for multiplying a membership function value in each concluding portion of each operating variable linguistic control rule by the oblivescence coefficient.

DETAILED DESCRIPTION OF THE PREFERRED EMBODIMENT

Reference will hereinafter be made to the drawings in order to facilitate a better understanding of the present invention.

Figure 1:
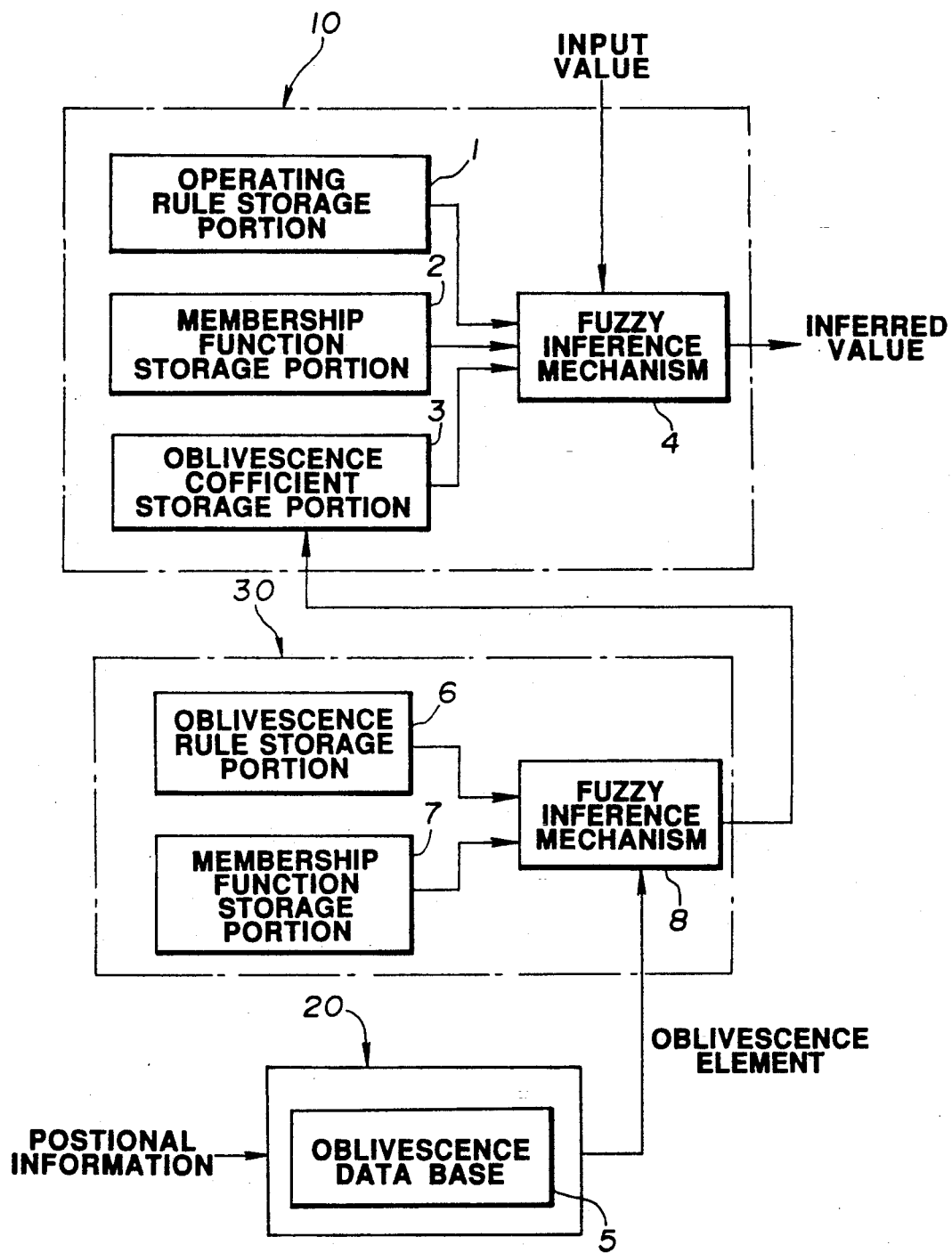
FIG. 1 is a schematic circuit block diagram of a preferred embodiment of a fuzzy inference apparatus according to the present invention.

FIG. 1 shows a preferred embodiment of a fuzzy inference executing apparatus applicable to a control of a shield machine carrying out tunnel trenching according to the present invention.

In FIG. 1, an operating variable fuzzy inference portion 10 receives input values, i.e., a deviated distance $x_1$ and a deviated distance $x_2$ in a horizontal direction and in a vertical direction between a planned trenching line and an actual direction of advance of the shield machine and has a function of inferring a target value of a stroke quantity of each shield machine jack through fuzzy inference.

The constituents of the operating variable fuzzy inference portion 10 are, a linguistc fuzzy control rule storage portion (operating rule storage portion) 1, membership function storage portion 2, oblivescence coefficient storage portion 3, and a fuzzy inference mechanism 4.

The operating rule storage portion 1 stores (,e.g., n number of) linguistic control rules.

The operating rules are such as to receive $x_1$, $x_2$ values as input values and provide the stroke quantities $y_1$, $y_2$, - - -, respectively, for inferred values (concluded values) supplied to jack portions 1, 2, - - - of the shield machine. One example will specifically be expressed as follows:

$$\left.\begin{array}{l}\text{IF } x_1 = A_1, x_2 = A_2 \\ \text{THEN } y_1 = B_1, -, y_n = B_2\end{array}\right\}\text{Rule 1}$$

.
.
.

$$\left.\begin{array}{l}\text{IF } x_1 = A_3, x_2 = A_4 \\ \text{THEN } y_1 = B_2, -, y_n = B_4\end{array}\right\}\text{Rule n}$$

Provided that $A_k$ (k denotes a natural number) and $B_k$ denote fuzzy labels.

Figure 2A:
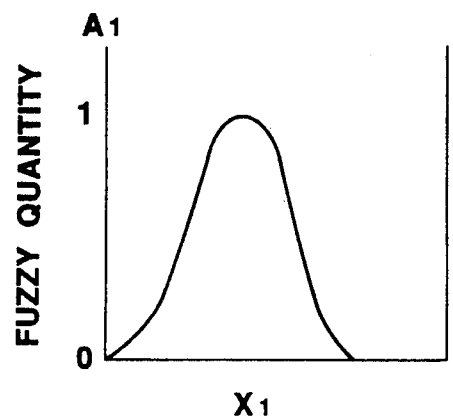
FIGS. 2 (A) and 2 (B) are graphs of membership functions of fuzzy labels with respect to input values in the preferred embodiment.
Figure 2B:
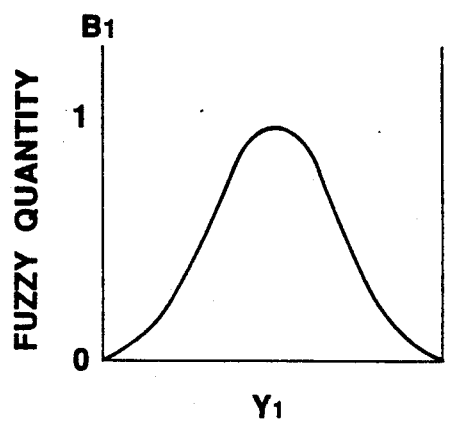

Membership functions as graphically shown in FIGS. 2 (A) and 2 (B) are stored in the membership function storage portion 2 and are allocated to the fuzzy labels $A_k$ and $B_k$, respectively. In addition, the oblivescence coefficient storage portion 3 stores oblivescence coefficients $G_1$ through $G_n$ which will be described later.

The oblivescence coefficients are inferred by an oblivescence coefficient fuzzy inference portion 8 as will be described later.

An oblivescence element calculating portion 20 is provided with an oblivescence data base 5 which stores, e.g., an initial relative position of the shield machine to a final position after the completion of the tunnel trenching when the respective fuzzy rules are established for operating variables of the jacks in the operating inference portion 10. When the present positional information of the shield machine is retrieved, a difference in distance between the positional information stored in the oblivescence data base 5 and the present positional information, i.e., a spatial interval of distance between these positions is derived. An inverse of the difference is normalized and its normalized value is output as the oblivescence element in FIG. 1.

An oblivescence coefficient estimating portion 30 includes an oblivescence rule storage portion 6, membership function storage portion 7 and fuzzy inference mechanism 8. The oblivescence rule storage portion 6 stores an oblivescence coefficient determining linguistic control rule for each operating variable fuzzy control rule in the operating fuzzy rule inference portion 10.

Each oblivescence determining linguistic control rule is constituted by fuzzy rules in which the oblivescence elements derived by the oblivescence element calculating portion 20 are set in condition portions of the respective input memebership fucntions and the oblivescence coefficients are set in conclusion portions thereof. Specifically, the linguistic control rule for deriving an oblivescence coefficient, corresponding to operating rule 1, is expressed as follows.

IF $i_1 = C_1$ THEN $G_1 = D_1$

In the rule expressed above, $i_1$ denotes an oblivescence element, $C_1$ and $D_1$ denote fuzzy labels. Membership functions as graphically shown in FIGS. 3 (A) and 3 (B) are allocated to these fuzzy labels $C_1$ and $D_1$. These are stored in the membership function storage portion 7.

Next, operation of the fuzzy inference executing apparatus according to the preferred embodiment will be explained below.

The present positional information of the shield machine is input to the oblivescence element calculating portion 20. Then, a difference between the present positional information of the shield machine and positional information when each operating rule is established is stored within the oblivescence data base 5. For example, suppose that the present position of the shield machine is $P_1$ and the position of the shield machine when operating rule 1 is established is $P_2$, the difference (distance) described above indicates $|\overrightarrow{P_1P_2}|$. To normalize the difference, the difference is inverted and the normalized value is output to the oblivescence coefficient estimating portion 30 as the oblivescene element. Consequently, oblivescence element $i_1$ through $i_n$ respectively corresponding to operating variable linguistic control rules 1 through n are input to the oblivescene coefficient estimating portion 30. Next, the fuzzy inference mechanism 8 causes the oblivescence elements for the respective rules to be applied to the oblivescence coefficient linguistic control rules to execute fuzzy inference. Then, the oblivescence coefficients $G_1$ through $G_n$ are derived.

Figure 3A:
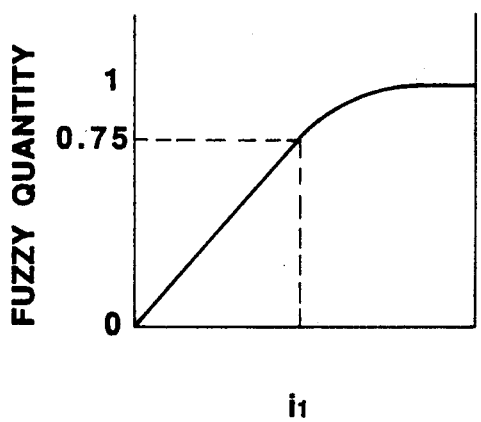
FIGS. 3 (A) and 3 (B) are graphs of membership functions of oblivescence fuzzy rules in the preferred embodiment to derive an oblivescence coefficient.
Figure 3B:
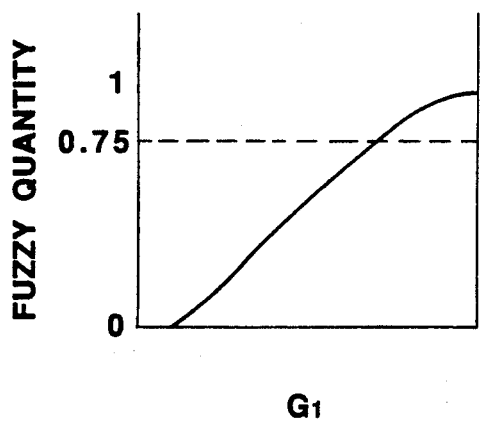

For example, to derive the oblivescence coefficient $G_1$ for the corresponding operating variable linguistic control rule 1, the membership value (0.75) of the membership function of $C_1$ corresponding to $i_1$ (=0.5), as shown in FIG. 3 (A), is first derived. This value serves to intersect (or cut) the membership function of $D_1$ of FIG. 3 (B) and a value of a center of gravity on the intersected area at an abscissa portion is derived as $G_1$. This fuzzy inference operation is repeated for all oblivescence coeeficients $G_1$ through $G_n$.

The oblivescence coefficients thus derived $G_1$ through $G_n$ are stored in the oblivencence coefficient storage portion 3. The fuzzy inference mechanism 4 multiplies the membership functions of the conclusion portions of the respective operating rules 1 through n by the oblivescence coefficients $G_1$ through $G_n$. The input values $x_1$ (deviated distance in the horizontal direction) and $x_2$ (deviated distance in the vertical direction) are applied to the fuzzy rules in order to infer stroke quantities $y_1$ through $y_n$ of the respective jacks 1 through n.

The above-described fuzzy rules are specifically depicted as follows:

$$\left.\begin{array}{l} \text{IF } x_1 = A_1, x_2 = A_2 \\ \text{THEN } y_1 = B_1 \cdot G_1, \ldots, y_n = B_2 \cdot G_1 \end{array}\right\} \text{Rule 1}$$

$$\vdots$$

$$\left.\begin{array}{l} \text{IF } x_1 = A_3, x_2 = A_4 \\ \text{THEN } y_1 = B_3 \cdot G_n, \ldots, y_n = B_4 \cdot G_n \end{array}\right\} \text{Rule n}$$

Simply speaking, in the case of rule 1, a lower value of the two values, i.e., a membership value of $A_1$ corresponding to $x_1$ and the membership value of $A_2$ corresponding to $x_2$ truncates (intersects) the membership functions $B_1 \cdot G_1$ through $B_2 \cdot G_1$. Such processings as described above are repeated for all Rules 1 through n. For the respective values of $y_1$ through $y_n$, portions truncated by the rules are overlapped together. Positions of center of gravities of the intersected sets of sums are the result of inference for the respective operating variables, i.e., $y_1$ through $y_n$. (Such fuzzy inference is called a Max-Min method.)

As described above, the oblivescence coefficients $G_1$ through $G_n$ are values indicating degrees of oblivescence of the operating rules, respectively, i.e., indicating weights.

Figure 4A:
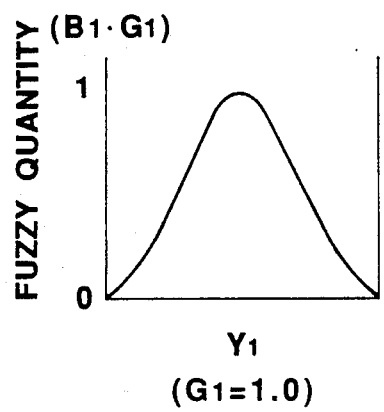
FIGS. 4 (A) through 4 (C) are explanatory views of oblivescenes states of fuzzy rules to derive operating variables of controlled objects in the preferred embodiment.
Figure 4B:
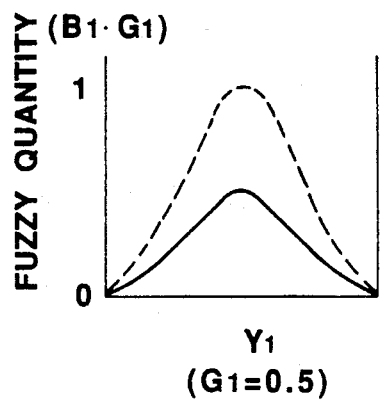
Figure 4C:
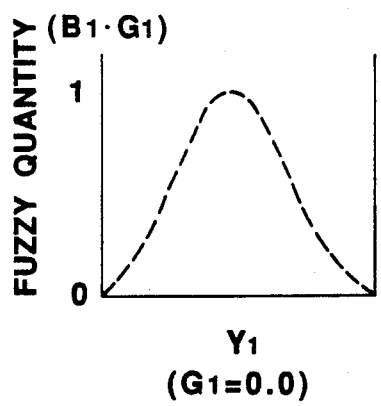

FIGS. 4 (A) through 4 (C) illustrate situations of oblivescences in the case of rule 1.

In a case where the position of the shield machine at the time of generating rule 1 is close to its present position, the oblivescence coefficient $G_1$ is, e.g., 1.0. The membership function $y_1$ in the rule 1 is in a form identical to that of $B_1$ (refer to FIG. 2 (B)), as shown in FIG. 4 (A). The generated rule 1 is directly reproduced. However, as the spatial distance becomes large, $G_1$ becomes, e.g., 0.5 so that the rule 1 is half forgotten as appreciated from FIG. 4 (B).

Furthermore, as the shield machine penetrates more deeply into the tunnel or trench and the spatial distance is considerably large, $G_1$ becomes zero and rule 1 is completely forgotten.

One reason that the oblivescence coefficients are introduced is that, as the position of the shield machine is varied, a soil quality is varied. If the present position is proximate a position when a particular rule is established, the soil quality will be similar so that the rule can directly be used or used in large proportion, in other words, the rule carries a high weight or importance. As the spatial distance becomes large, the soil quality or other conditions vary and the weighting of the rules can be lowered.

In the preferred embodiment, although the spatial distance between the position at which the values are input when the rule is established as the oblivescence and the position at which the input values are input during the use of the rule are used, each oblivescence element may be derived from the value corresponding to a time (day and time, etc.) during which the rule is established and the difference between the information $I_1$ representing the time and situation and the present information $I_2$.

It is noted that the data within the oblivescence data base 5 storing the information $I_1$ at the time of rule generation ($I_1$ corresponds to the position of the shield machine in the preferred embodiment) is updated for each generation of the rules.

As described hereinabove, since according to the present invention the oblivescence coefficients are introduced and multiplied by the (output) membership functions in the conclusion functions of the operating rules and, e.g., oblivescence coefficients are determined according to elements such differences between times, locations, and/or situations, for example, and the rules are established and used through fuzzy inference so that the degrees of oblivescences in the operating rules, or weight, is varied, the operating rules can flexibly be used according to date, location, situation or other suitable factors and the base of knowledge utilized at a given time will be significant. Consequently, the knowhow of a well-skilled operator (expert) can be approached to provide an actual solution to a problem.

It should be noted that, in the preferred embodiment, the time when a particular operating variable linguistic control rule is established may be defined as a time when its oblivasecence coefficient indicates zero, as a time when the spatial distance indicates zero, and/or as a time when the position of the shield machine is at a start position of trenching.

It will fully be appreciated by those skilled in the art tha the forgoing description has been made in terms of the preferred embodiment and various changes and modifications may be made without departing from the scope of the present invention which is to be defined by the appended claims.

What is claim is:

1. An apparatus for providing a plurality of stroke quantities ($y_1 \sim y_n$) of shield jacks of a tunnel bowling shield machine using fuzzy inferences, comprising:
   a) first means having an oblivescence data base, responsive to a present position information ($P_1$) of the shield machine, for providing a plurality of oblivescence elements, used to derive respective oblivescence coefficients ($G_1 \sim G_n$), on the basis of a difference between the present positon information ($P_1$) and a previous position information ($P_2$) of the shield machine;
   b) second means for executing a series of first fuzzy inferences using a plurality of oblivescence linguistic control rules, to which the oblivescence elements provided by the first means are applied, to derive the oblivescence coefficients ($G_1 \sim G_n$) for an n number of operating variable fuzzy logic linguistic control rules;

c) third means, responsive to deviated distance values ($x_1$, $x_2$) of the position of the shield machine from a target scheduled line along which the shield machine is to be advanced, for executing a series of second fuzzy inferences, using the operating variable fuzzy logic linguistic rules to which the oblivescence coefficients ($G_1 \sim G_n$) are applied and to which the deviated distance values ($x_1$, $x_2$) of the position of the shield machine from the target scheduled line are applied, to derive the respective stroke quantities ($y_1 \sim y_n$) of the shield jacks so that the shield machine is advanced along the target scheduled line according to the respective stroke quantities of the shield jacks derived therefrom; and d) means for advancing the shield machine along the target scheduled line according to the respective stroke quantities of the shield jacks derived therefrom.

2. A method for providing a plurality of stroke quantities ($y_1 \sim y_n$) of shield jacks of a tunnel bowling shield machine using fuzzy inferences, comprising the steps of:

a) responsive to a present position information ($P_1$) of the shield machine, providing a plurality of oblivescence elements, used to derive respective oblivescence coefficients ($G_1 \sim G_n$), on the basis of a difference between the present position information ($P_1$) and a previous position information ($P_2$) of the shield machine;

b) executing a series of first fuzzy inferences using a plurality of oblivescence linguistic control rules, to which the oblivescence elements provided in the first step a) are applied, to derive the oblivescence coefficients ($G_1 \sim G_n$) for an n number of operating variable fuzzy logic linguistic control rules;

c) responsive to deviated distance values ($x_1$, $x_2$) of the position of the shield machine from a target scheduled line along which the shield machine is to be advanced, executing a series of second fuzzy inferences, using the operating variable fuzzy logic linguistic rules to which the oblivescence coefficients ($G_1 \sim G_n$) are applied and to which the deviated distance values ($x_1$, $x_2$) of the position of the shield machine from the target scheduled line are applied, to derive the respective stroke quantities ($y_1 \sim y_n$) of the shield jacks so that the shield machine is advanced along the target scheduled line according to the respective stroke quantities of the shield jacks derived therefrom; and d) advancing the shield machine along the target scheduled line according to the respective stroke quantities of the shield jacks derived therefrom.

* * * * *